United States Patent [19]

Field et al.

[11] Patent Number: 4,626,405

[45] Date of Patent: Dec. 2, 1986

[54] CRUCIFORM SKELETON AND WATER CROSS FOR A BWR FUEL ASSEMBLY

[75] Inventors: David H. Field; William E. Kirby; Theodore W. Nylund, all of Columbia, S.C.

[73] Assignee: Westinghouse Electric Corp., Pittsburgh, Pa.

[21] Appl. No.: 584,424

[22] Filed: Feb. 28, 1984

[51] Int. Cl.$^4$ .............................................. G21C 3/32
[52] U.S. Cl. .................................... 376/448; 376/438; 376/439; 376/443; 376/444
[58] Field of Search ............... 376/438, 448, 439, 443, 376/444

[56] References Cited

U.S. PATENT DOCUMENTS

| 3,350,275 | 8/1965 | Venier et al. | 376/434 |
| 3,466,226 | 9/1969 | Lass | 376/434 |
| 3,802,995 | 4/1974 | Fritz et al. | 376/434 |

FOREIGN PATENT DOCUMENTS 1150423  7/1983  Sweden .............................. 376/448

Primary Examiner—Donald P. Walsh

[57] ABSTRACT

A water cross for delivering non-boiling water to the center of a BWR fuel assembly for improved moderation and fuel economy. A cruciform skeleton is assembled from grid straps and connecting straps positioned at axial locations along stiffening rods. The skeleton is inserted into a flow channel to provide support for rectangular or square water tubes which are inserted through the skeleton into the flow channel to form an internal water cross. A method for forming a water cross is also disclosed.

41 Claims, 6 Drawing Figures

CRUCIFORM SKELETON AND WATER CROSS FOR A BWR FUEL ASSEMBLY

BACKGROUND OF THE INVENTION

1. Field of the Invention

The device of the present invention generally relates to nuclear fuel assemblies for use with nuclear reactors, and more particularly, to a new and more improved cruciform skeleton and water cross for a water flow channel of a nuclear fuel assembly especially adapted for use in a boiling water reactor (BWR).

2. Description of the Prior Art

The generation of a large amount of heat energy through nuclear fission in a nuclear reactor is well known. This energy is dissipated as heat in elongated nuclear fuel rods. A plurality of nuclear fuel rods are usually grouped together to form separately removable nuclear fuel assemblies. A number of such nuclear fuel assemblies are typically arranged in a matrix to form a nuclear reactor core capable of a self sustained, nuclear fission reaction. The core is typically submersed in a fluid, such as light water, that serves as a coolant for removing heat from the nuclear fuel rods and as a neutron moderator.

A typical nuclear fuel assembly may be formed by a 7×7 or 8×8 array of spaced apart, elongated rods supported between upper and lower tie plates. Examples of such nuclear fuel assemblies are depicted and described in U.S. Pat. Nos. 3,350,275; 3,466,226; 3,802,995. In a typical boiling water reactor a nuclear fuel assembly having an 8×8 rod array, the sixty four rods that form the 8×8 array may be either sixty four fuel rods or may have one or more non-fueled, water moderator rods with remaining rods being fuel rods. A common problem in typical boiling water reactor nuclear fuel assemblies of the types depicted in the above identified patents is that the central region of the fuel assemblies may be under-moderated and over-enriched. In order to increase the flow of moderator, one or more elongated, water moderator rods have been substituted for fuel rods in the central region of such nuclear fuel assemblies. For example, water moderator rods 41 and 42 are depicted in and described in the above identified '995 patent. Of course, the use of one or more moderator rods prevents the use of a full compliment of fuel rods, i.e. one fuel rod in each rod lattice position within the fuel assembly.

In the above mentioned typical boiling water reactor nuclear fuel assembly, the outer flow channel has been formed of an alloy of zirconium known as Zircaloy and is structurally unsupported across its cross section perpendicular to its longitudinal axis. At reactor operating conditions, such an outer flow channel may deform slightly due to creep. Attempts have been made to counteract creep deformation by using an outer flow channel with thicker walls in order to extend its life. However, using thicker walls increases parasitic neutron absorption in the reactor core with resultant increases in fuel cycle costs.

In some BWR fuel assemblies an elongated internal central water cross is used to eliminate the need for water moderator rods, thus allowing a full compliment of fuel rods to be used, that is one fuel rod in each rod lattice position. One such water cross may be formed from four elongated metal angles that divide the fuel assemblies into four, separate, elongated fuel sections, each section having a separate, elongated fuel bundle or subassembly located therein. Each separate fuel bundle includes an upper tie plate, a lower tie plate and a plurality of elongated fuel rods disposed therebetween.

In such fuel assemblies, four elongated solid structural ribs may be centrally secured to the inner walls of the outer flow channel and spaced ninety degrees apart about the inner periphery of the outer flow channel. The lateral outer ends of the four metal angles are secured to the structural ribs to form a central water cross thereby providing a centrally disposed path for the flow of subcooled neutron moderator along the length of the fuel rods to improve the neutron moderation and economy. Such a water cross design is disclosed in commonly assigned, copending application Ser. No. 368,555 Filed Apr. 15, 1982 the disclosure of which is hereby incorporated by reference.

The above described central water cross and the four structural ribs located along the lengths of the inner walls of the outer flow channel lower the stress intensity and the creep deformation of outer flow channel by pinning its interior walls at their mid-spans, and by reducing the deformable span length by a factor of two to improve the mechanical performance of the fuel assembly. Thus, an outer flow channel having a thinner wall thickness may be used with a central cross and still have superior creep resistance and mechanical strength properties. However, such a central water cross is difficult to fashion and requires the use and fashioning of several large, precision formed metal angles.

SUMMARY OF THE INVENTION

On object of the present invention is to provide a new an improved nuclear fuel assembly.

Another object of the present invention is to provide a new and improved nuclear fuel assembly especially adapted for use in a boiling water reactor.

A further object of the present invention is to provide a new and improved nuclear assembly that includes a centrally disposed, internal, subcooled moderator flow path along the length of the fuel assembly, while at the same time maintaining a full compliment of fuel rods, that is a fuel rod in each fuel rod lattice position within the nuclear fuel assembly.

Another object of the present invention is to provide a new and improved nuclear fuel assembly that includes a cruciform skeleton and water cross for a BWR fuel assembly.

The water cross designed of the present invention provides superior structural strength for the outer flow channel in comparison with the prior art.

In accordance with the present invention, a moderator flow assembly for delivering nonboiling water to the center of the fuel assembly is provided. The moderator flow assembly comprises a plurality of axially spaced, cruciform shaped grid assemblies each of the grid assemblies being formed by orthogonal pairs of spaced, parallel elongate grid straps which define the cruciform shape of the grid assembly. Each of the plurality of spaced grid assemblies are aligned with the remaining grid assemblies so that the grid assemblies can cooperate to support a plurality of moderator tubes which are inserted into the grid assemblies and held in a cruciform array by the grid assemblies. Advantageously, the nuclear fuel assembly will comprise a flow channel and the cruciform grid assemblies will be axially spaced and aligned by being attached to four stiffening rods. The combination of the grid assemblies and stiffening rods forms a cruciform skeleton which is inserted into the flow channel. The stiffening rods are then affixed to the opposing inside surfaces of the flow channel and the water tubes are inserted.

In another aspect of the present invention, a method for forming a water cross in a fuel assembly enclosed in a flow channel having opposing walls is disclosed. The method comprises forming a plurality of cruciform shaped grid assemblies, each of the grid assemblies comprising orthogonally disposed pairs of spaced, parallel, elongate grid straps having four terminal ends. The grid assemblies are then axially spaced and aligned in the flow channel and affixed to the opposing walls of the flow channel. Moderator tubes are then inserted through the plurality of grid assemblies in order to form a water cross.

Preferably, the step of axially spacing and aligning the grid assemblies comprises the forming of a cruciform skeleton by affixing the terminal ends of the grid assemblies to four elongate, axially extending stiffening rods which are affixed to the opposing walls of the flow channel after inserting of the skeleton into the flow channel. Alternatively, the flow channel may be provided with slots to accept taps on the grid assemblies whereby the grid assemblies are automatically aligned and spaced in the flow channel.

BRIEF DESCRIPTION OF THE DRAWINGS

The above and other objects and advantages and novel features of the present invention will become apparent from the following detailed description of the presently preferred embodiment of the invention illustrated in the accompanying drawing wherein.

DESCRIPTION OF THE PREFERRED EMBODIMENT

Figure 1:
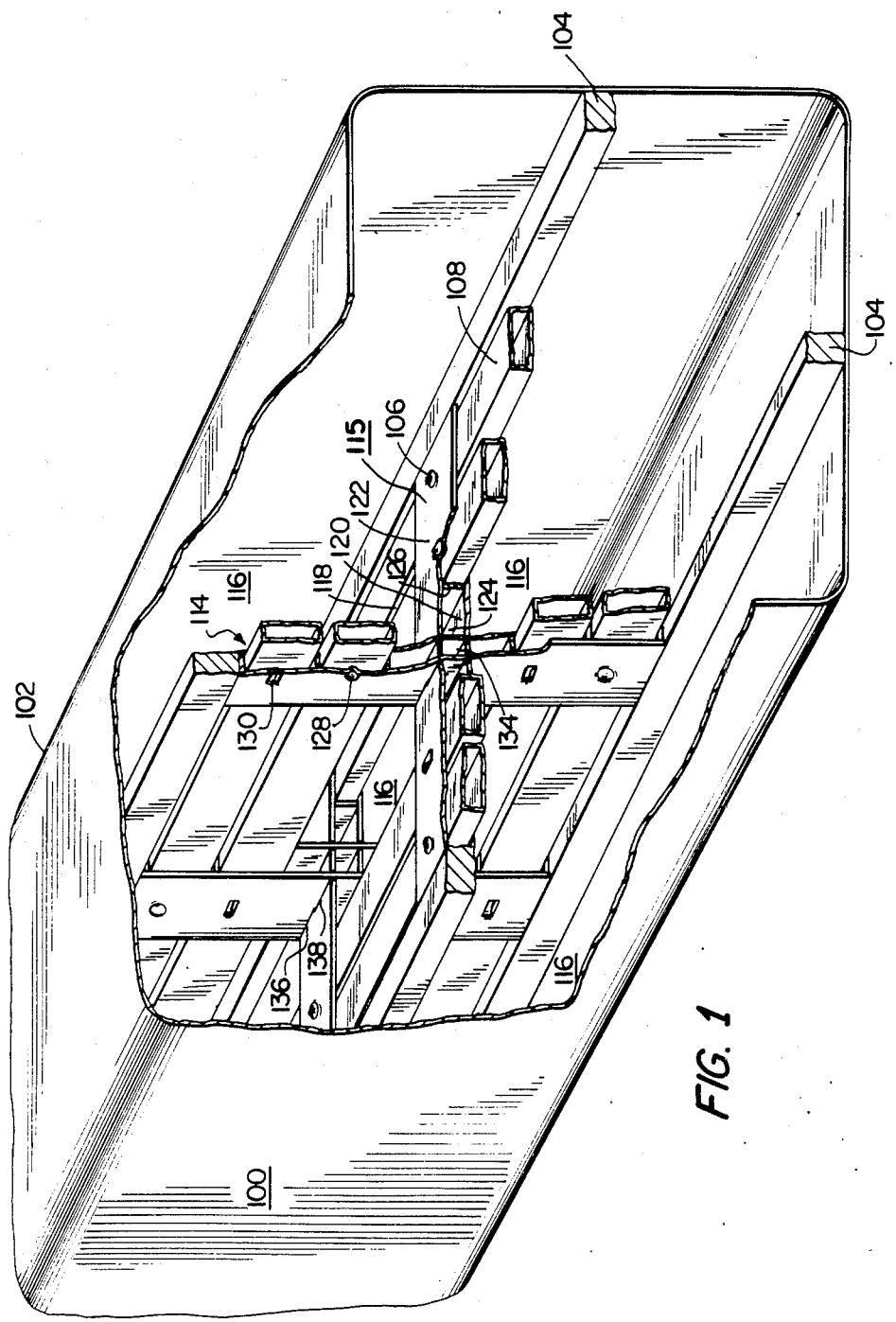
FIG. 1 is a prospective, fragmentary view of a cruciform skeleton for forming a water cross showing a fragment of several exemplary moderator tubes as well as a fragment of the surrounding flow channel.

Reference will now be made in detail to the present preferred embodiment of the invention, an example of which is illustrated in the accompanying drawings. Turning now to the drawings there is illustrated a new and improved nuclear fuel assembly 100 constructed in accordance with the principles of the present invention. The fuel assembly 100 includes an elongated, flow impervious, outer flow channel 102 that is preferably formed from a alloy of zirconium, commonly known as Zircaloy, that extends substantially along the entire length of the fuel assembly 100 and which structurally interconnects an upper yoke and a lower nozzle assembly (not illustrated). Preferably, the yoke and the nozzle assembly are formed from reactor grade stainless steel and are described in the above mentioned U.S. patent application Ser. No. 368,555.

In accordance with an important feature of the present invention, secured to and centrally located along the lengths of the four inner walls of the flow channel 102 are a plurality of four spaced apart, solid rectangular structural ribs or stiffening rods 104 that may be secured to the four inner walls of the flow channel 102 by any convenient means, such as welding a mechanical attachment. The stiffening bars are preferably formed of Zircaloy. The lower most ends of the four stiffening rods 104 terminate slightly above the lower end of the flow channel 102 and the upper ends of the stiffening rods 104 terminate near the upper longitudinal end of the flow channel 102. The upper ends of the four stiffening rods 104 may be received within four complimentary elongated slots (not illustrated) integrally formed in the above mentioned yoke.

In accordance with a further important aspect of the present invention, a plurality of cruciform shaped grid assemblies 106 have their outer lateral ends welded to the stiffening rods 104 to form an internal water cross skeleton 115. The water cross skeleton 115 is adapted to hold a plurality of generally rectangular or square moderator or water tubes 108 that form a centrally located water cross 114 which comprises a closed flow path for subcooled neutron moderator along the length of the fuel assembly 100. The central water cross thus formed has its lowermost end adjacent a lower end of the flow channel 102 and its uppermost end adjacent to an upper end of the flow channel 102. Further description in this regard can be had by reference to above-mentioned Ser. No. 368,555 at FIGS. 21 and 22. As illustrated in FIG. 4A, the lowermost end 110 of the moderator tubes 108, preferably include a plurality of integrally formed moderator flow restrictors 112 for controlling the amount or flow rate of moderator flowing through the central water cross 114 formed by the moderator tubes 108.

In accordance with an important feature of the present invention, the central water cross 114 together with the inner walls of the flow channel 102 divide the fuel assembly 100 into four, separate, elongated fuel sections or quadrants 116 along the length of the fuel assembly 100. A plurality of passages 118 formed between the moderator tubes 108 that form the central water cross 114 provide coolant flow between the separate fuel sections 116. The passages 118 extend the length of the central water cross 114 and provide for fuel bundle coolant pressure equalization between adjacent fuel bundles or subassemblies located in each of the four separate fuel sections 116.

The cruciform skeleton grids 106 are preferably made of Zircaloy and are axially spaced along the fuel assembly to hold the moderator tubes 108 which are preferably square or rectangular in cross section in a cruciform array. The moderator tubes 108 are preferably made of Zircaloy as well.

The orthogonal arms of each cruciform skeleton grid 106 are preferably formed from two elongate, parallel grid straps 120 and 122. Two pairs of grid straps 120 and 122 cross orthogonally and are preferably welded together or otherwise joined at their intersection. The grid straps are parallel, i.e., substantially everywhere equidistant and not meeting, with the distance between straps being just sufficient to accomodate one linear outside dimension (width or depth) of the water tubes 108. This dimension also naturally conforms to the thickness along the wall of the structural ribs 104. The grid may have cells 124 formed therebetween by the connecting cross straps 126. Preferably, the cross straps 126 are welded to the grid straps 120, 122. The straps forming each cell may advantageously be provided with means for holding the water tubes within the grid. Such holding means may include dimples 128 and/or springs 130 as required in order to securely hold the moderator tubes 108. Such springs or dimples may be integrally formed by punching or stamping the grid straps 120 and 122 or the connecting cross straps 126 as required. The illustration of springs and dimples in FIG. 1 is exaggerated for clarity and should only be viewed as nonlimiting examples of holding means for the moderator tubes 108. It should be understood that very little force is required to hold the water tubes 108 and the spring and dimple 130 and 128 respectively may be omitted. In addition, as illustrated in FIGS. 2 and 3 the cross straps 126 can be omitted entirely and the moderator tubes 108, simply welded to the grid straps 120 and 122.

The number and size of the moderator tubes 108 depends on specific design needs such as the size and power output of the fuel assembly. A cruciform skeleton 115, such as that illustrated in FIG. 1 but without the water tubes 108 or the flow channel 102 is preferably preassembled and welded outside of the flow channel 102. Preferably, the cruciform skeleton 115 is then inserted into the channel 102 and the stiffening rods 104 are welded to the flow channel 102. The welds may be internal fillet welds or external, through the wall or external plug walls. The center cell 134 formed at the intersection of the orthogonal pairs of grid straps 120 and 122 may be formed by cutting the grid straps with half high slits 136 and 138 to form a so called egg-crate cell. The precise number, spacing between and configuration of cruciform shaped grids 106 is selected in accordance with the particular thermal, hydraulic, nuclear, and mechanical properties of the fuel assembly for which it is intended.

Figure 2:
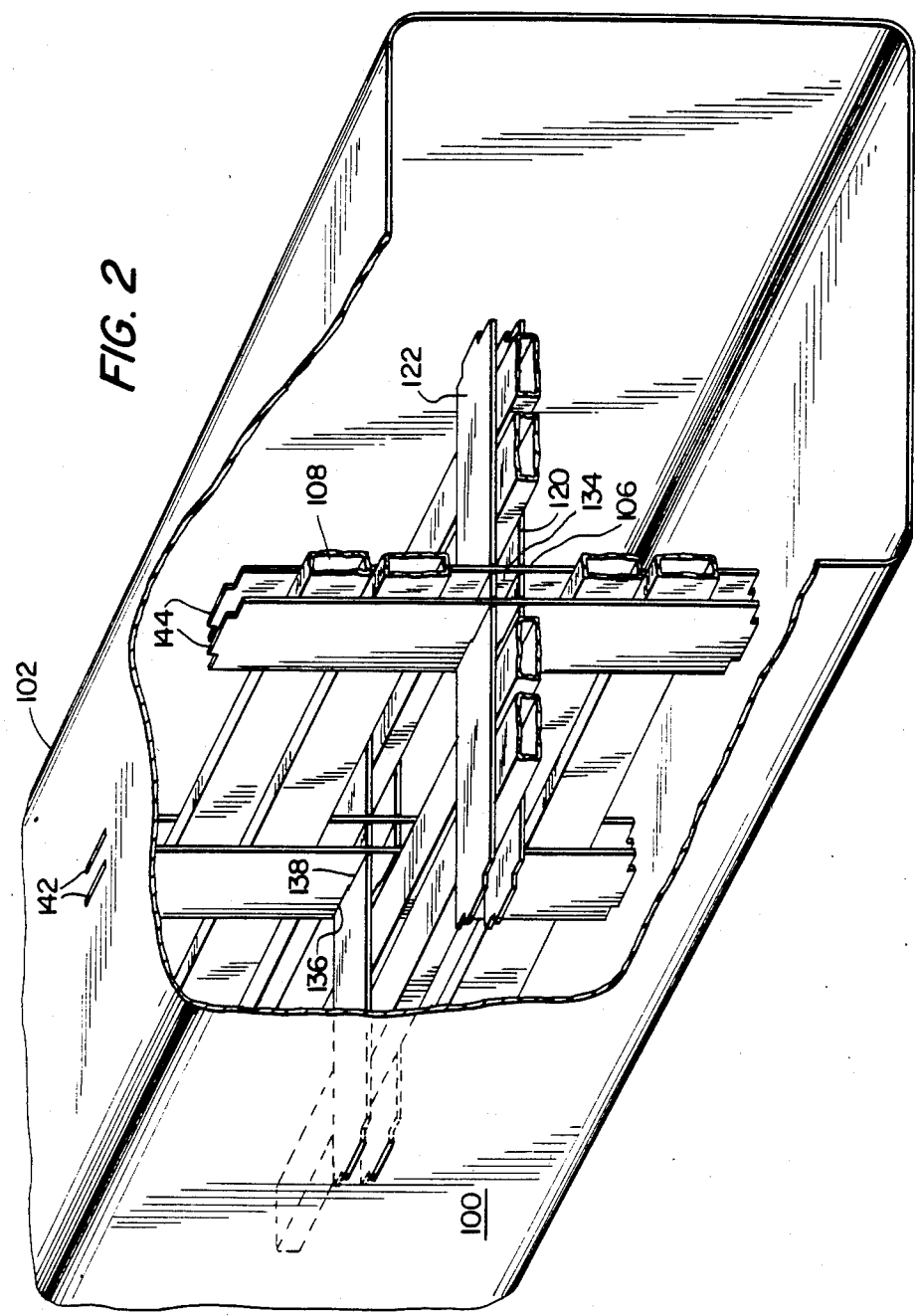
FIG. 2 is a perspective, fragmentary view of an alternate embodiment of a cruciform skeleton for forming a water cross.

Turning to FIG. 2, there is illustrated a second embodiment of a cruciform skeleton grid 106. In this embodiment the stiffening rods 104 are omitted and are replaced by a joint comprising tabs 144 formed at the ends of grid straps 120 and 122. The end tabs 144 are received in slots 142 formed in the flow channel 102 and are preferably welded in place. In this illustration, the optional cross straps 126 depicted in FIG. 1 have been omitted and the moderator tubes 108 are welded or mechanically attached to the cruciform skeleton grid 106.

Figure 3:
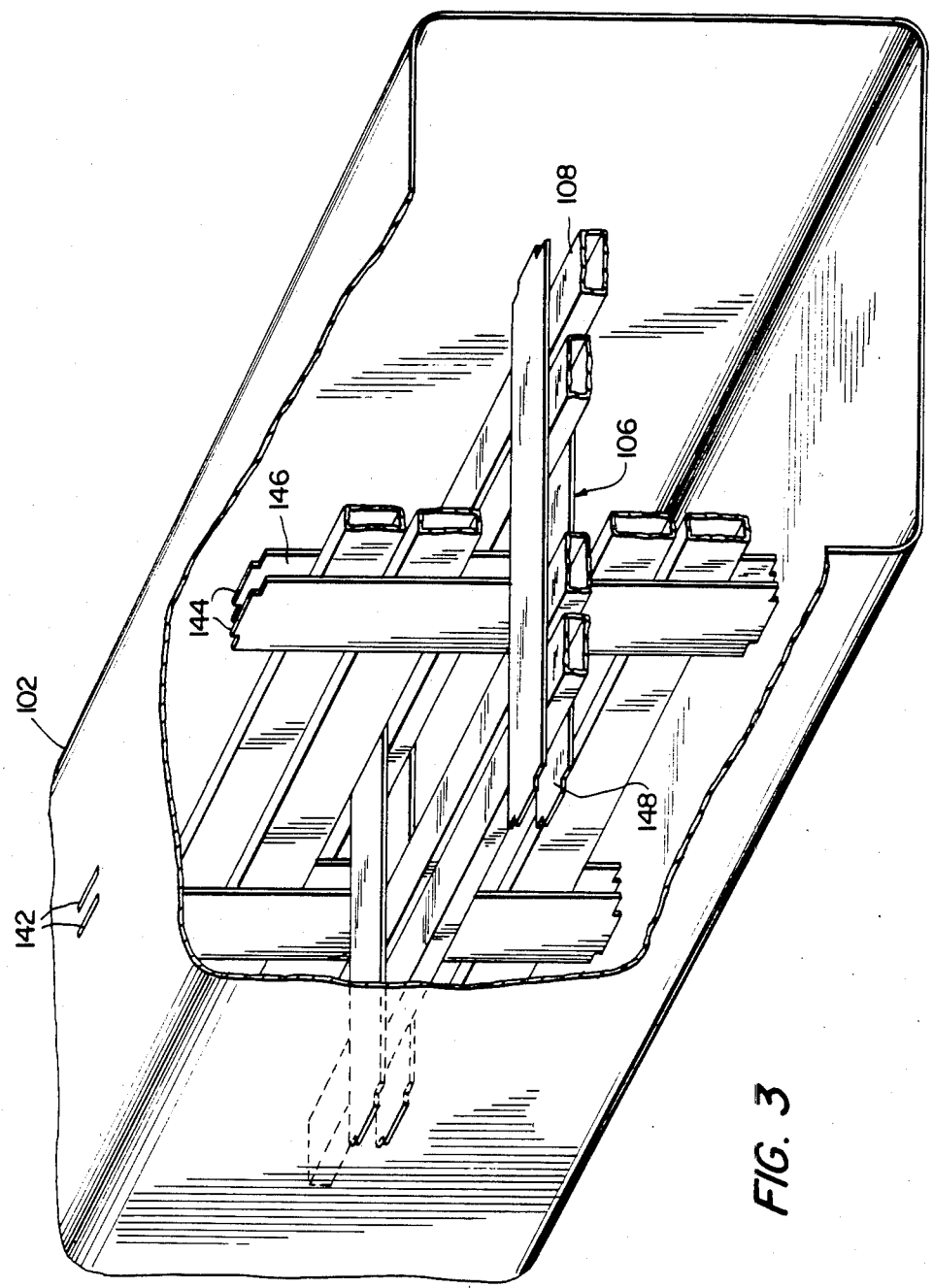
FIG. 3 is a perspective fragmentary view of another alternate embodiment of a cruciform skeleton for forming a water cross.

In FIG. 3, a third embodiment of the invention is depicted. In this embodiment the orthogonal arms 146 and 148 of the cruciform skeleton grid 106 are staggered along the axial direction of the fuel assembly.

Accordingly, the grid orthogonal arms 146 and 148 of the cruciform skeleton grid 106 are not interlaced to form a central cell 134 as in the embodiments of FIGS. 1 and 2. It should be noted that while the staggered grid arms of FIG. 3 are depicted as having end tabs 144 which are received in slots 142, the staggered grid arm design can also be used in connection with the stiffening rod attachment method of FIG. 1.

Figure 4:
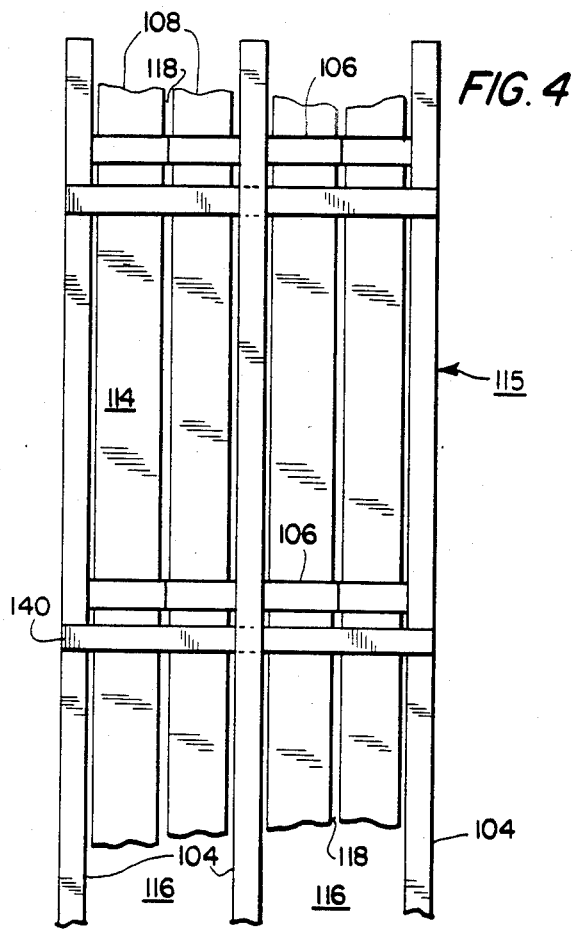
FIG. 4 is a plan, fragmentary view of the cruciform skeleton of FIG. 1 illustrating exemplary fuel rod grid assembly location.
Figure 4A:
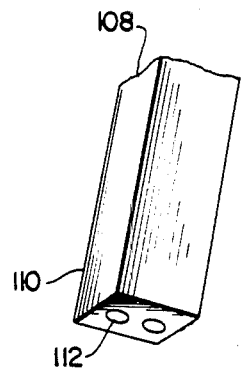
FIG. 4A is a perspective, fragmentary view of an exemplary water tube showing flow restricting openings at the water tube bottom.
Figure 5:
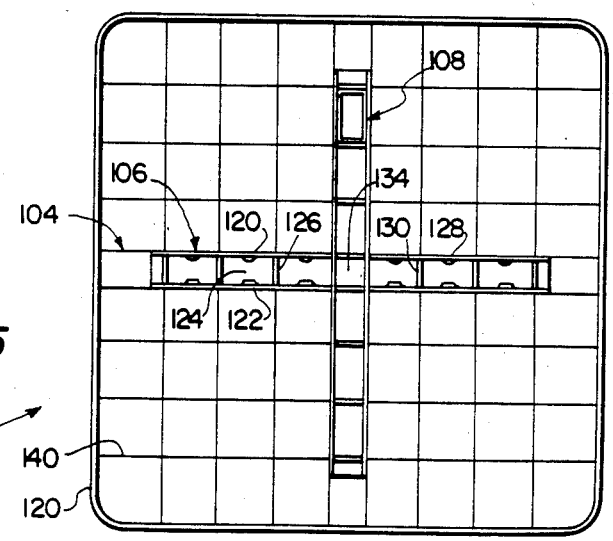
FIG. 5 is a top view of the cruciform skeleton of FIG. 1 showing the position of exemplary fuel rod grid assemblies in the flow channel and illustrating an exemplary moderator tube.

Turning to FIG. 4, there is illustrated a cruciform skeleton 115 showing the position of exemplary fuel rod spacer grid assemblies 140. The cruciform skeleton grid 106 may be advantageously positioned in the vicinity of the spacer grid assemblies 140 which may be a conventional assembly of known design for holding fuel rods in a lateral array within the fuel bundles or subassemblies disposed within each quadrant of the flow channel 102. It is preferred however that the cruciform skeleton grids 106 be positioned so as to be axially just above or just below the fuel rod spacer grid assemblies 140. As should now be apparent, the cruciform skeleton of the present invention is an assembly made of grid straps and optional connecting cross straps and positioned at various axial locations along stiffening rods on flow channel walls or directly on the flow channel walls. This assembly is advantageously used in a BWR flow channel to provide support for rectangular or square moderator tubes 108 which are inserted into the flow channel 102 to form an internal, generally centrally disposed water cross 114 therein. The internal moderator tubes 108 deliver non-boiling or supercooled water to the center of the fuel assembly for improved moderation and neutron economy.

The foregoing description of a preferred embodiment of the invention has been presented for purposes of illustration and description. It is not intended to be exhaustive or to limit the invention to the precise form disclosed and obviously many modifications and variations are possible in light of the above teaching. For example, the moderator tubes may be other than square or rectangular in cross section although such shapes do provide the maximum amount of moderator flow for the space available. In addition, the axial location of the cruciform skeleton grid assemblies 106 relative to the fuel rod spacer grid assemblies 140 may be varied and the number of the fuel rod spacer grids may be more or less that of the cruciform skeleton grid assemblies 106 depending upon the mechanical, thermal, hydraulic and nuclear considerations. The springs and dimples for holding the moderator tubes illustrated herein are not intended to be limiting and any configuration which will laterally support the moderator tubes 108 may be employed. The embodiment was chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

We claim:

1. A moderator flow assembly for delivering nonboiling water to a nuclear fuel assembly comprising:
    (a) a plurality of axially spaced, cruciform-shaped grid assemblies, each of said grid assemblies being formed by orthogonal pairs of spaced, parallel elongate grid straps, which define said cruciform shape;
    (b) and a plurality of moderator tubes held in a cruciform array in said fuel assembly by said cruciform-shaped grid assemblies.

2. The moderator flow assembly of claim 1 wherein said nuclear fuel assembly further comprises a flow channel and a plurality of axially extending, elongated stiffening rods adapted to be affixed to opposing inside surfaces of said flow channel and wherein said pair of spaced parallel grid straps each have ends affixed to opposing stiffening rods.

3. The moderator flow assembly of claim 2 wherein each of said cruciform-shaped grid assemblies further comprises a plurality of orthogonally extending connecting straps affixed between said pairs of spaced, parallel grid straps, said connecting straps and grid straps defining a plurality of moderator tube cells.

4. The moderator flow assembly of claim 3 wherein each of said plurality of moderator tube cells includes a means for holding said moderator tubes.

5. The moderator flow assembly of claim 4 wherein said holding means comprises a resilient biasing means and an opposing dimple formed in each of said water tube cells.

6. The moderator flow assembly of claim 3 wherein said moderator tube cells are generally rectangular or square in cross section and said moderator tubes have a cross section generally corresponding to the cross section of said moderator tube cells.

7. The moderator flow assembly of claim 6 wherein said cruciform array of water tubes divides said flow channel into four quadrants and wherein a space is defined between adjacent moderator tubes for permitting fluid communication between said quadrants.

8. The moderator flow assembly of claim 1 wherein said fuel assembly further comprises a plurality of axially spaced fuel rod spacer grids and wherein said fuel rod spacer grids are disposed in the vicinity of said cruciform-shaped grid assemblies.

9. The moderator flow assembly of claim 1, wherein said moderator tubes are provided with flow restrictors for regulating the moderator flow therethrough.

10. The moderator flow assembly of claim 2 wherein said stiffening rods are affixed to said flow channel by welding.

11. The moderator flow assembly of claim 3 wherein said connecting straps are made from Zircaloy.

12. The moderator flow assembly of claim 2 wherein said stiffening rods are made from Zircaloy.

13. The moderator flow assembly of claim 1 wherein each of said grid straps has an end tab and wherein said nuclear fuel assembly further comprises a flow channel, said flow channel having slots for receiving said end tabs to capture said cruciform-shaped grid assemblies in said flow channel.

14. The moderator flow assembly of claim 13 wherein said orthogonal pairs of spaced parallel grid straps are interlaced to form a central cell.

15. The moderator flow assembly of claim 13 wherein said orthogonal pairs of spaced parallel grid straps are axially staggered.

16. The moderator flow assembly of claim 2 wherein said orthogonal pairs of spaced parallel grid straps are interlaced to form a central cell.

17. The moderator flow assembly of claim 3 wherein said orthogonal pairs of spaced parallel grid straps are axially staggered.

18. The moderator flow assembly of claim 13 wherein each of said cruciform-shaped grid assemblies further comprises a plurality of orthogonally extending connecting straps affixed between said pairs of spaced, parallel grid straps, said connecting straps and grid straps defining a plurality of moderator tube cells.

19. The moderator flow assembly of claim 18 wherein said moderator tube cells are generally rectangular or square in cross section and said plurality of moderator tubes have a cross section generally corresponding to the cross section of said moderator tube cells.

20. The moderator flow assembly of claim 18 wherein said connecting straps are made from Zircaloy.

21. A method of forming a water cross in a fuel assembly enclosed in a flow channel having opposing walls comprising:
  (a) forming a plurality of cruciform shaped grid assemblies, each of said grid assemblies comprising orthogonally disposed pairs of spaced, parallel, elongate grid straps, each of said grid assemblies having four terminal ends;
  (b) axially spacing and aligning said grid assemblies;
  (c) inserting said axially spaced and aligned grid assemblies into said flow channel;
  (d) affixing said spaced and aligned grid assemblies to said opposing walls of said flow channel;
  (e) inserting moderator tubes through said plurality of axially spaced and aligned grid assemblies to thereby form a water cross.

22. The method of claim 21 wherein the step of axially spacing and aligning further comprises the step of affixing the terminal ends of assemblies to four elongate, axially extending stiffening rods and wherein the step of affixing comprises affixing said stiffening rods to said opposing walls of the flow channel.

23. The method of claim 21 wherein the step of axially spacing and aligning further comprises the steps of providing each of said grid straps with end tabs and providing said flow channel with end tab receiving slots and wherein the step of affixing further comprises affixing said end tabs in said end tab receiving slots.

24. A nuclear fuel assembly for a BWR reactor having a flow channel and a plurality of fuel bundles disposed within said flow channel and a moderator flow assembly for delivering non-boiling water to the center of said nuclear fuel assembly, said moderator flow assembly comprising:
  a plurality of axially spaced, cruciform-shaped grid assemblies, each of said grid assemblies being formed by orthogonal pairs of spaced, parallel, elongate grid straps which define said cruciform shape; each of said axially spaced plurality of grid assemblies being aligned with all remaining axially spaced grid assemblies, and a plurality of moderator tubes adapted to be inserted into and held in a cruciform array by said grid assemblies.

25. The nuclear fuel assembly of claim 24 further comprising a plurality of axially extending, elongated stiffening rods adapted to be affixed to opposing inside surfaces of said flow channel and wherein said pairs of grid straps have ends affixed to opposing stiffening rods.

26. The nuclear fuel assembly of claim 24 wherein each of said grid straps has end tabs and wherein said flow channel has end tab receiving slots operable to capture said grid assemblies in said flow channel.

27. The nuclear fuel assembly of claim 24 wherein said orthogonal pairs of grid straps are interlaced.

28. The nuclear fuel assembly of claim 24 wherein said orthogonal pairs of grid straps are axially staggered.

29. The nuclear fuel assembly of claim 24 wherein said grid straps further comprise a plurality of connecting straps affixed between each of said pairs of grid straps to define therewith a plurality of moderator tube cells for holding said plurality of moderator tubes.

30. A moderator flow assembly for delivering non-boiling water to a nuclear fuel assembly comprising:
  (a) a plurality of axially spaced, cruciform-shaped grid assemblies, each of said grid assemblies comprising a plurality of adjoining rectangular moderator tube cells which define said cruciform shape;

(b) each rectangular moderator tube cell of one of said axially spaced plurality of grid assemblies being axially aligned with a corresponding moderator tube cell in all remaining grid assemblies, and a plurality of moderator tubes adapted to be inserted into said axially aligned moderator tube cells and held in a cruciform array by said grid assemblies.

31. The moderator flow assembly of claim 30 wherein said nuclear fuel assembly further comprises a flow channel and a plurality of axially extending, elongated stiffening rods adapted to be affixed to opposing inside surfaces of said flow channel and wherein said cruciform-shaped grid assemblies further comprise a pair of orthogonally related, interlocking cell assemblies, the ends of each of said pair of cell assemblies being affixed to opposing stiffening rods.

32. The moderator flow assembly of claim 31 wherein each of cell assemblies comprises a pair of elongate parallel grid straps having a plurality of orthogonally extending connecting straps affixed therebetween, said parallel grid straps and connecting straps defining said moderator tube cells.

33. The moderator flow assembly of claim 30 wherein each of said moderator tube cells includes a means for holding said moderator tubes.

34. The moderator flow assembly of claim 33 wherein said holding means comprises a resilient biasing means and an opposing dimple formed in each of said moderator tube cells.

35. A method of forming a water cross in a fuel assembly enclosed in a flow channel having opposing walls comprising:
(a) forming a plurality of cruciform-shaped grid assemblies, each of said grid assemblies having a plurality of adjacent, rectangular cells and four terminal ends;
(b) axially spacing and aligning said grid assemblies so that corresponding cells of each grid assembly are axially aligned;
(c) inserting said axially spaced and aligned grid assemblies into said flow channel;
(d) affixing said spaced and aligned grid assemblies to said opposing walls of said flow channel;
(e) inserting rectangular moderator tubes through each of said plurality of adjacent rectangular cells and through said corresponding cells of said axially spaced and aligned grid assemblies to thereby form a water cross.

36. The moderator flow assembly of claim 1 wherein each of said moderator tubes has a rectangular cross section with one of an outer width and an outer depth of said cross section being substantially equal to a spacing of one of said pairs of parallel grid straps.

37. The moderator flow assembly of claim 2 wherein each of said moderator tubes has a rectangular cross section and each of said stiffening rods has a rectangular cross section; and
wherein one of an outer width and an outer depth of said moderator tube cross section and one of a width and depth of said stiffening rod cross section substantially equal a spacing between one of said pairs of parallel grid straps.

38. The nuclear fuel assembly of claim 24 wherein each of said moderator tubes has a rectangular cross section with one of an outer width and an outer depth of said cross section being substantially equal to a spacing between one of said pairs of parallel grid straps.

39. The nuclear fuel assembly of claim 25 wherein each of said moderator tubes has a rectangular cross section and each of said stiffening rods has a rectangular cross section; and
wherein one of an outer width and an outer depth of said moderator tube cross section and one of a width and a depth of said stiffening rod cross section substantially equal a spacing between one of said pairs of parallel grid straps.

40. The moderator flow assembly of claim 32 wherein each of said moderator tubes has a rectangular cross section with one of an outer width and an outer depth of said cross section being substantially equal to a spacing between one of said pairs of parallel grid straps.

41. The moderator flow assembly of claim 32 wherein each of said moderator tubes has a rectangular cross section and each of said stiffening rods has a rectangular cross section; and
wherein one of an outer width and an outer depth of said moderator tube cross section and one of a width and depth of said stiffening rod cross section substantially equal a spacing between one of said pairs of parallel grid straps.

* * * * *